(12) United States Patent
Cooper

(10) Patent No.: US 10,484,369 B2
(45) Date of Patent: Nov. 19, 2019

(54) VOICE AUTHENTICATION VIA SECONDARY DEVICE

(71) Applicant: NCR Corporation, Duluth, GA (US)

(72) Inventor: Jeffrey Stephen Cooper, Kitchener (CA)

(73) Assignee: NCR Corporation, Atlanta, GA (US)

( * ) Notice: Subject to any disclaimer, the term of this patent is extended or adjusted under 35 U.S.C. 154(b) by 310 days.

(21) Appl. No.: 15/338,771

(22) Filed: Oct. 31, 2016

(65) Prior Publication Data

US 2018/0121642 A1  May 3, 2018

(51) Int. Cl.
*H04L 29/06* (2006.01)
*G06F 21/32* (2013.01)
*H04W 12/00* (2009.01)

(52) U.S. Cl.
CPC .......... *H04L 63/0853* (2013.01); *G06F 21/32* (2013.01); *H04L 63/0861* (2013.01); *H04L 63/0884* (2013.01); *H04L 2463/082* (2013.01); *H04W 12/00502* (2019.01)

(58) Field of Classification Search
CPC .............. G06F 15/18; G06F 17/30011; G06F 17/30412; G06F 17/30563; G06F 17/30917; G06F 21/6227; G06F 9/38; G06F 16/683; G06F 3/165; G06F 3/167; H04L 63/08; H04L 63/10; H04L 9/32; G10L 15/22; G10L 15/26; G10L 15/265; G10L 21/06; G06Q 30/02; G06Q 50/12; H04M 1/6066; H04M 2201/60; H04M 2242/30; H04M 3/4878; H04M 3/493; H04M 3/4931; H04M 3/4936
See application file for complete search history.

(56) References Cited

U.S. PATENT DOCUMENTS

| | | | |
|---|---|---|---|
| 2004/0006478 A1* | 1/2004 | Alpdemir | G06Q 30/02 704/275 |
| 2011/0296194 A1* | 12/2011 | Herkes | G06F 21/34 713/185 |
| 2013/0318585 A1* | 11/2013 | Hosoda | G06F 21/335 726/7 |
| 2014/0269425 A1* | 9/2014 | Fisher | H04L 41/0809 370/254 |
| 2016/0321627 A1* | 11/2016 | McCracken | G06Q 20/1085 |

* cited by examiner

*Primary Examiner* — Abiy Getachew
(74) *Attorney, Agent, or Firm* — Schwegman, Lundberg & Woessner, P.A.

(57) ABSTRACT

A user initiates a voice request to perform an operation with an external service and provides a voice credential for the operation. A determination is made as to whether the user has used a separate device from that which is associated with the voice request to log into the external service within a preceding amount of time before the voice request and/or within a succeeding amount of time following the voice request. If the user has such a login with the external service, the voice operation is processed on behalf of the user with the external service using the voice credential; otherwise the voice request is ignored.

19 Claims, 4 Drawing Sheets

_US 10,484,369 B2_

VOICE AUTHENTICATION VIA SECONDARY DEVICE

BACKGROUND

Voice-based services are becoming popular in the industry. Typically, these services are available as an application on a consumer operated device, such as the popular Apple® Siri® service. In some cases, the voice-based services are provided on their own independent devices, such as Amazon® Echo®. These voice-based service may have plugin modules providing the user the ability to access other user services or some of the user's messaging services (e.g., Twitter®, Facebook®, Instagram®, etc.).

Any real security on these messaging-based platforms and voice-based services is lacking. Frequently, these platforms are hacked and the news reports that user's accounts have been compromised. With the ability to integrate other user-based services through a mobile-application or browser-based interface to these voice-based services, even more security holes are readily apparent.

For example, a user may use the voice-service as a front end for accessing another sensitive service of the user, such as the user's bank services. The voice-service simply translates the user's voice to text and performs operations through the back-service's user-facing web interface. The user may speak sensitive information, such as a Personal Identification Number (PIN) or a password associated with the user's bank account for purposes of having the voice-service perform some bank operation as the user with the banking service. Anyone within earshot of the user could hear this and subsequently perform the same operations on the user's voice-service or a different voice-service not even associated with the user.

Moreover, these user-based services often store a history of interactions with the user. These histories are often stored in a cloud (server) environment. Access to these cloud storage locations are not very secure and can be easily compromised. So, spoken security information from a user can be obtained with little effort by a hacker of only modest skill.

Essentially, the rate of user acceptance for voice-based services and the expansion of integrated non-voice based services have not kept up with the necessary security. This is especially true where sensitive, private, or confidential information is spoken by the user.

SUMMARY

In various embodiments, methods and a system for voice authentication through a second device are presented.

According to an embodiment, a method for voice authentication through a secondary device is provided. Specifically, and in one embodiment, a request is received to validate a successful login of a user to an external service. At least one login event for the user with the external service is obtained. Next, a first time that the request was received is compared against a second time associated with the at least one login event. Finally, an audio agent is provided with an indication as a result of the comparing as to whether the successful login for the user occurred.

DETAILED DESCRIPTION

Figure 1:
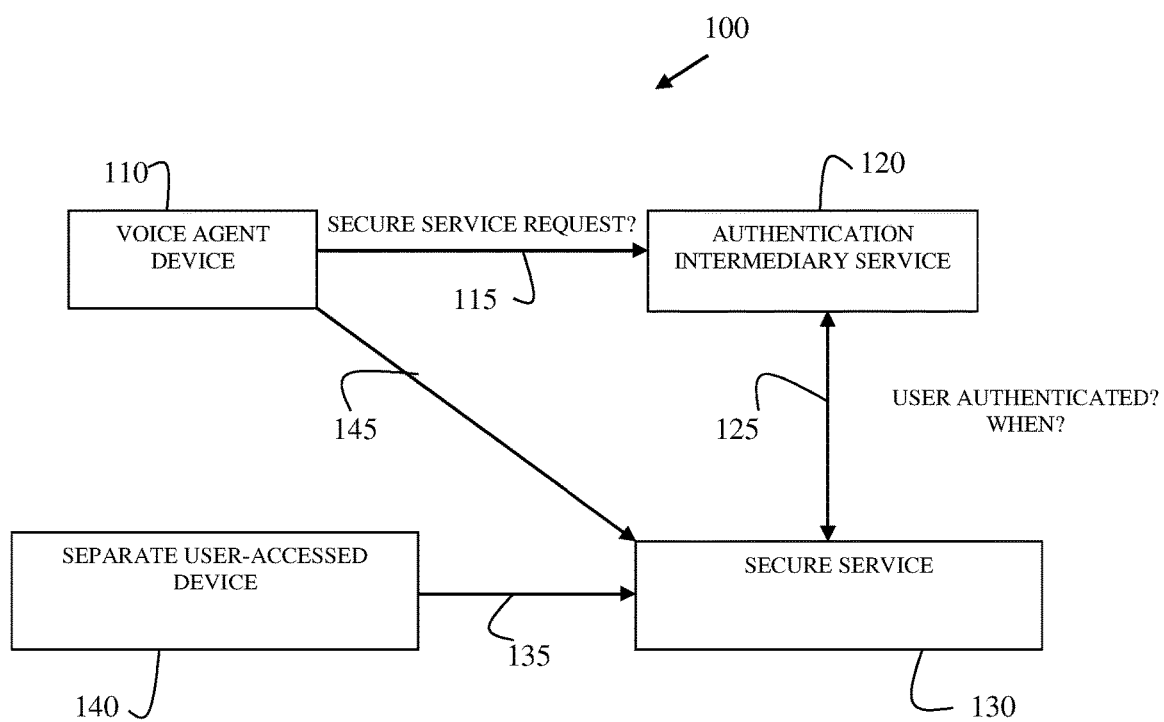
FIG. 1 is a diagram of a system for voice authentication through a secondary device, according to an example embodiment.

FIG. 1 is a diagram of a system 100 for voice authentication through a secondary device, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the voice authentication through a secondary device techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for voice authentication through a secondary device can be implemented in all, or some combination of the components shown in different hardware computing devices having one or more hardware processors.

The system 100 includes: a voice agent device 110, an authentication intermediary service 120, a secure service 130, and a separate user-accessed device 140.

The various components of the system 100, the network-based connections (115, 125, 135, and 145), and the processing will be discussed within the context of an operational example. It is to be noted that this example context is presented for purposes of illustration and comprehension and is not intended to limit the various embodiments presented here to just the provided context.

Initially, a user signs up or otherwise registers for the additional security provided by the authentication intermediary service 120. This can be done by a web-based interface through any user-operated device and a user-facing interfacing of the authentication intermediary service 120. During registration the user can identify specific user-accessed service for which the user wants the additional voice authentication through a secondary device, such as by the user identifying the secure service 130. The user also provides a valid user identifier (id) for a valid account that the user has with the secure service 130.

Separately, the secure service 130 includes an Application Programming Interface (API) that permits the authentication intermediary service 120 to either query the secure service 130 for a login history of the secure service's user accounts or permits a push notification to be sent from the secure service 130 when a user successfully logs into the secure service 130. The pull approach (through the query API) or the push approach (through the notification) provides a minimal amount of metadata that is accessible to the secure service 130, such as user id date, and time of day.

Optionally, and in an embodiment, the secure service 130 and the authentication intermediary service 120 may have no pre-establish separate and specialized means of communication with one another. In this embodiment, when the user registers with the authentication intermediary service 120, the user provides the login credentials that the user provides when accessing the secure service 130. This embodiment would permit the authentication intermediary service 120 to log in and pose as the user with the online user interface of the secure service 130 and access the user's account with the secure service 130. Although providing user credentials may not be a preferred scenario, if a user is providing credentials through voice anyway, the user may elect to do this option.

In yet another embodiment, the authentication intermediary service 120 and the secure service 130 have a trusted relationship with one another, such that the authentication intermediary service 120 has a special account with the secure service 130 providing limited access to the secure service 130, such that the authentication intermediary service 120 can log into and establish a secure session with the secure service 130 and perform limited and non-volatile operations, such as query the login history for all users of the secure service 130 and search for the user's id. In this embodiment, the user may not even have to register with the authentication intermediary service 120 as a valid id for the user that is known to the secure service 130 can be provided by the voice agent of the voice agent device 110.

In still another embodiment, the authentication intermediary service 120 and the secure service 130 use a trusted third party (identity manager) that can provide an assertion on behalf of the authentication intermediary service 120, which is recognized and trusted by the secure service 130. This permits the authentication intermediary service 120 to provide a user id that is known by the secure service 130 along with the assertion for limited access to search the login history of the secure service 130. The assertion may be an encrypted token or certificate encrypted with a private key of the identity manager and a public key of the secure service 130. The secure service 130 decrypts with the public key of the identity manager and the private key of the secure service 130.

In fact, a variety of other situations are possible, such that the authentication intermediary service 120 has some mechanism by which the authentication intermediary service 120 can obtain through a push (interface for securely accessing the secure service) or pull mechanism (real-time event driven user login notifications) a login history for the user from the secure service 120.

Moreover, there does not have to be, in some embodiments, any interface between the voice agent device 110 and the authentication intermediary service 120. For example, the authentication intermediary service 120 may be a reverse proxy for the secure service 130, such that when the voice agent device 110 attempts to access the secure service 130, the secure service 130 redirects to the authentication intermediary service 120. This can be done based on an Internet Protocol (IP) and/or Media Access Control (MAC) address of the voice agent device 110 that is configured in a front-end access server router for the secure service 130 to identity known devices or servers from which known standalone devices provide voice-based services, such as Amazon Echo® standalone devices.

Additionally, the voice agent associated with the voice agent device 110 may have an API for communicating with the authentication intermediary service 120. Here, there is direct and known communications between the voice agent and the authentication intermediary service 120 for purposes of the voice agent querying the authentication intermediary service 120 as to a specific user login event condition (such as has the user successfully logged into the secure service 130 within the last N minutes). The voice agent providing with the query the user id for the secure service 130.

Still further the user may register for the additional authentication and security provided by the authentication intermediary service 120 (as described herein and below) through profile settings or through an interface of the voice agent. In this case, the user need not specifically register for the added authentication services of the authentication intermediary service 120, since this can be noted through the profile of the user with the voice agent. Moreover, activation of the additional authentication services provided by the authentication intermediary service 120 may be a setting associated with a profile that the user maintains for the secure service 130 with the voice agent (the same location that the user may have linked the secure service 130 with the voice agent and registered the user's login id for the user's account with the secure service 130).

Thus, there is a variety of mechanism through which the user agent device 110 (device processing the voice agent), the authentication intermediary service 120, and the secure service 130 can be initially configured for interaction.

Once a desired initial configuration is established, the voice agent device 110 in (direct or indirect) communication with the authentication intermediary service 120, and the authentication intermediary service 120 in (direct or indirect) communication with the secure service 130 provide novel additional voice-initiated authentication for purposes of the voice agent accessing a user account of the user with the secure service 130.

The user initiates a voice command to the voice agent (processing on the voice agent device 110) to access and perform some operation or action with the secure service 130 on behalf of the user. In so doing, the user is requested by the voice agent or provides with no request being specifically made by the voice agent a confidential piece of information needed to access the secure service 130, such as a PIN, password, or phrase.

A request for accessing the secure service 130 (made through voice commands by the user to the voice agent) is communicated by the voice agent to the authentication intermediary service 120 over network connection 115 (wired, wireless, or a combination of wired and wireless). In an embodiment, the request includes a known user id for the user to access the secure service 130. In an embodiment, the request by the agent only includes an identifier for the user with the voice agent (here the user may have linked the user's id with the voice agent and the user's id with the secure service 130 during a registration of the user with the authentication intermediary service 120, such that the authentication intermediary service 120 maps the request having the user's voice agent id to the user's id with the secure service 130 by searching a registered user data store to obtain the linked user id for the secure service 130).

The authentication intermediary service 120 then makes a request over a network connection 125 (wired, wireless, or a combination of wired and wireless) to query the secure service 130 and identify when the user had last successfully logged into the secure service 130 (through any of the configurations for interaction between the authentication intermediary service 120 and the secure service 130 discussed above). In an embodiment, the request or query over 125 is not needed at all, such as when the secure service 130 provides real-time event notifications each time the user successfully logs into the service 130.

It should also be noted that in this latter embodiment, the real-time event notifications can be published by the secure service 130 to a third-party secure site, such that the authentication intermediary service 120 can log into that third-party secure site and query for any user log in events with the secure service 130. This permits a variety of disparate secure service to publish their unique service identifier user login event notifications in real time and means that the authentication intermediary service 120 need not have any specific direct interface, account, and/or trusted mechanism for specifically receiving the event notifications directly from the secure service 130.

The authentication intermediary service 120 and/or the voice agent are configured to determine whether the user has logged into the secure service 130 within a configured number of minutes that preceded the user voice initiated request for access to the secure service and relayed by the voice agent at 115. For example, either the voice agent of the authentication intermediary service 120 can determine whether a time stable associated with the request 115 was within 5 minutes of the last successful login that the user performed over the separate user-accessed device 140 using network connection 135 (wired, wireless, or a combination of wired and wireless). The last known successful login of the user with the secure service 130 has a time stamp (calendar date and time of day) and the request at 115 also has a time stamp, so if these two events are within the configured number of minutes (5 in the example), either the authentication intermediary service 120 provides an authenticated message to the voice agent or the voice agent determines (when the last known successful login of the user is provided by the authentication intermediary service 120 to the voice agent) that it is acceptable for the user to access the secure service 130. When it is acceptable, the voice agent over network connection 145 accesses the secure service 130 on behalf of the user and performs the user's requested action or operation using the previously provided voice credential provided initially by the user with the initial request for the voice agent to perform the operation or action on behalf of the user with the secure service 130. It is to be noted that the voice credential provided by the user need not be communicated by the voice agent over connection 113 to the authentication intermediary service 120 because the authentication intermediary service 120 does not need that credential (thus reducing risk of wire exposure for the user credential). Moreover, the voice agent uses the voice credential in text format for accessing the secure service as the user over the secure service's user-facing online interface.

In the event that the user has not successfully logged into the secure service 130 within the configurable amount of preceding time from when the user makes the voice request to access the service, the voice agent and the authentication intermediary service 120 may be configured to wait an additional configured number of succeeding minutes that follow the initial voice request to determine if the user does log into the secure service 130 using the separate user-accessed device 140 over connection 135. In this case, the voice agent does not tell the user that the separate login is needed within the configured number of minutes following the initial user voice request. This provides added security such that should an eavesdropper be around the user, that eavesdropper will be unaware of this additional and secondary requirement for the user to separately login and authentication with the secure service 130 using a non-voice login and a device 140 that is separate from the device 110 that is processing the voice agent.

The number of preceding minutes and optional additional succeeding minutes can be configured. In an embodiment, this can be a user-defined and established configured number of minutes. In an embodiment, this is preset by the authentication intermediary service 120, the secure service 130, and/or voice agent. In an embodiment, the configured number of preceding minutes is different from the configured number of additional succeeding minutes.

If succeeding minutes are provided as an additional option to the preceding minutes and those succeeding number of configure minutes pass, then the voice agent disregards the user's initial voice request for the operation with the secure service 130 or verbally communicates to the user that the user request cannot be performed. When no succeeding minutes are provided as an option, then the voice agent ignores the initial user request or verbally communicates to the user that the request cannot be performed after determining that the user has not successfully logged into the secure service 130 through a separate user-accessed device 140 within the configured preceding number of minutes that preceded the initial user voice request to the voice agent.

The approach discussed herein and above is different than a traditional Time-Based One Time Password (TOTP), in that those approaches are cumbersome and require the user to communicate a new key (password) typically texted to the user. This TOTP approaches may or may not use different devices from which the user initially authenticated but both all approaches require the user authenticate through a new provided credential (texted password). That is not the case here, as the user's credentials with the secure service 130 are the same when the user logs in through initiated voice commands with the voice agent and when the user separately logs into the secure service 130 through the separate user-accessed device 140. Additionally, with the approaches herein, the log in by the user has to occur through a separate device 140 from that which the voice initiated request was made 110. Additionally, there may be no prior login by the user or prior login attempt made by the user before the user logs in to the service 130 (succeeding login following the voice request that necessitated a login), with TOTP approaches the user is either already partially logged in to a service or has actively attempted to log into the service otherwise no TOTP is sent to the user. Still further, the channel through which authentication is performed is different (voice proceeding over 135 versus 145, whereas with TOTP the channel is typically the same (the user goes back to the original login on the original channel and enters the code sent through text to the user's phone).

In an embodiment, the voice agent device 110 is one of: a standalone voice-agent only device (Amazon Echo®, etc.), a phone, a tablet, a wearable processing device, and intelligent appliance (part of the Internet of Things (IoTs), a desktop computer, a processor-enabled vehicle, and a laptop.

In an embodiment, the separate user-accessed device 140 is one of: a phone, a tablet, a wearable processing device, and intelligent appliance (part of the Internet of Things (IoTs), a desktop computer, a processor-enabled vehicle, and a laptop.

The agent device 110 is separate than the user-accessed device 140 (an additional device). However, the two devices can be, in some embodiments, a same type of device (e.g., both wearable processing devices or tablets).

In an embodiment, the device processing the intermediary authentication service 120 can be one of: a cloud processing environment including a group of cooperating servers and a server.

In an embodiment, the device processing the secure service 130 can be one of: a cloud processing environment including a group of cooperating servers and a server.

In an embodiment, all or some portion of the processing associated with the intermediary authentication service 130 can be subsumed within the agent device 110 and/or the agent service.

These and other embodiments are now discussed with reference to the FIGS. 2-4.

Figure 2:
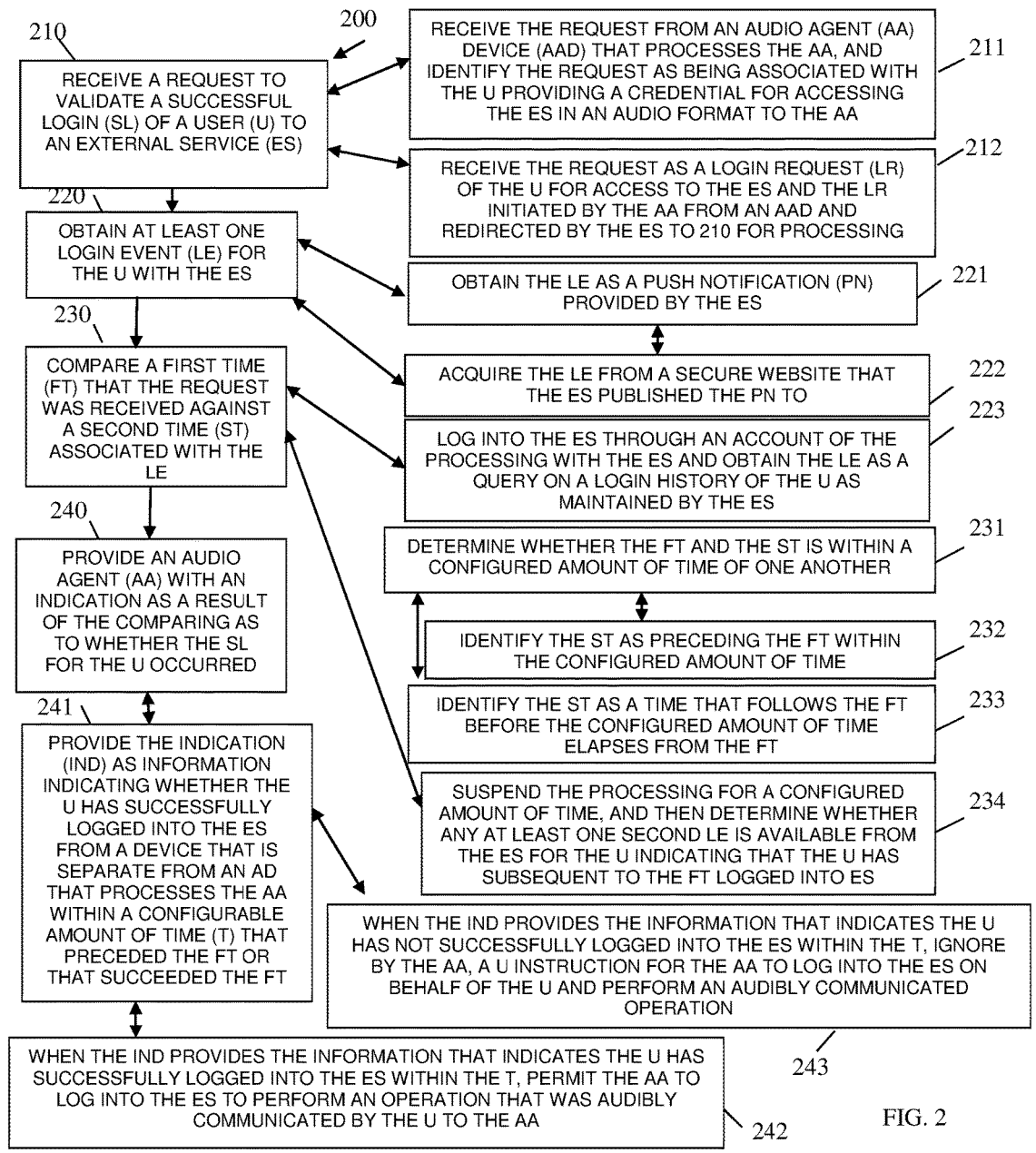
FIG. 2 is a diagram of a method for voice authentication through a secondary device, according to an example embodiment.

FIG. 2 is a diagram of a method 200 for voice authentication through a secondary device, according to an example embodiment. The software module(s) that implements the method 200 is referred to as an "authentication intermediary." The authentication intermediary is implemented as executable instructions programmed and residing within memory and/or a non-transitory computer-readable (processor-readable) storage medium and executed by one or more hardware processors of a hardware computing device. The processors of the device that executes the authentication intermediary are specifically configured and programmed to process the authentication intermediary. The authentication intermediary has access to one or more networks during its processing. The networks can be wired, wireless, or a combination of wired and wireless.

In an embodiment, the device that executes the authentication intermediary is the device or set of devices that process in a cloud processing environment.

In an embodiment, the device that executes the authentication intermediary is a server.

In an embodiment, the authentication intermediary is some combination of or all of: the authentication intermediary service 130.

At 210, the authentication intermediary receives a request to validate a successful login of a user to an external service. It is noted that this is not an actually login by the user but a pre-authorization that precedes a user even actually performing a login attempt to the external service.

According to an embodiment, at 211, the authentication intermediary receives the request from an audio agent device that is processing an audio agent (discussed above and below). Here, the authentication intermediary identifies the request as being associated with the user providing a credential for accessing the external service in an audio format to the audio agent. The audio agent configured to translate the audio credential to text and access a user-facing interface of the external service to log into the external service as the user and perform some operation on behalf of and posing as the user.

In an embodiment, at 212, the authentication intermediary receives the request as a login request of the user for accessing the external service and the login request initiated by the audio agent processing on an audio agent device. Here, the external service or a router of the external service recognizes the IP or MAC address or identifier for the audio agent device and redirects the audio agent's attempt to login as the user through the external service's user-facing interface to the processing at 210 (the processing associated with the authentication intermediary). Here, the authentication intermediary processes on a server that is serving as a reverse proxy for the external service.

It is also to be noted that the manners in which the authentication intermediary receives the request to validate a successful login of the user is not restricted to the processing of 211 and 212 but can be done in any of the manners discussed above with the FIG. 1 as well.

At 220, the authentication intermediary obtains at least one login event (just "login event" hereinafter) that the user has with the external service.

According to an embodiment, at 221, the authentication intermediary obtains the login event as a push notification provided (directly or indirectly) to the authentication intermediary by the external service.

In an embodiment of 221 and at 222, the authentication intermediary acquires the login event from a secure website (indirect acquisition of the push notification) that the external service published the push notification on or to.

In an embodiment, at 223, the authentication intermediary logs into the external service through an account of the authentication intermediary (method 200) that the authentication intermediary independent has with the external service. The authentication intermediary then obtains the login event as a query initiated (through an API or interface of the external service) against or on a login history of the user as maintained by the external service. This login history may be for all users of the external service or a login history associated with just the user.

At 230, the authentication intermediary compares a first time that the request was received, at 210, against a second time associated with the login event.

According to an embodiment, at 231, the authentication intermediary determines whether the first time and the second time is within a configured amount of time of one another. The configured amount of time can be a setting or a parameter associated with one or more of: the user, the external service and/or the audio agent. Moreover, in an embodiment, the configurable amount of time is user-defined and set as an option or profile setting provided by the user for an account with the authentication intermediary, an account with the audio agent, and/or an option available in the authentication intermediary for the external service.

In an embodiment of 231 and at 232, the authentication intermediary identifies the second time as preceding (in time) the first time (at 210) within the configured amount of time. Here, the user has successfully logged into the external service (independent of the audio agent) at a time that preceded the time of receiving the request (at 210).

In an embodiment of 231 and at 233, the authentication intermediary identifies the second time as a time that follows the first time (210) and before the configured amount of time elapses from the first time (210). In other words, the user is given a configured amount of time after the time associated with 210 to separately log into the external device from a device that is separate from the device that processed the audio agent.

In an embodiment, at 234, the authentication intermediary temporarily suspends processing for a configured amount of time and then reinitiates to determine whether any subsequent obtained login event for the user with the external service is available for the user indicating that the user has subsequent to the first time (210) successfully logged into the external service.

At 240, the authentication intermediary provides the audio agent with an indication as a result of the comparing (230) as to whether the request to validate the successful login by the user to the external service has occurred.

According to an embodiment, at 241, the authentication intermediary provides the indication as information indicating whether the user has successfully logged into the external service from a device that is separate from the audio device that processes the audio agent within a configurable amount of time that preceded the first time (210) or that followed or succeeded the first time (210).

In an embodiment of 241 and at 242, the authentication intermediary, when the indication provides the information that indicates the user has successfully logged into the external service within the configured amount of time, permits the audio agent to log into the external service to perform an operation that was audibly communicated by the user to the audio agent.

In an embodiment of 241, and at 243, the authentication intermediary, when the indication provides the information that indicates the user has not successfully logged into the external service within the configured amount of time, instructs the audio agent to ignore a user instruction for the audio agent to log into the external service on behalf of the user and perform an audibly communicated operation.

Figure 3:
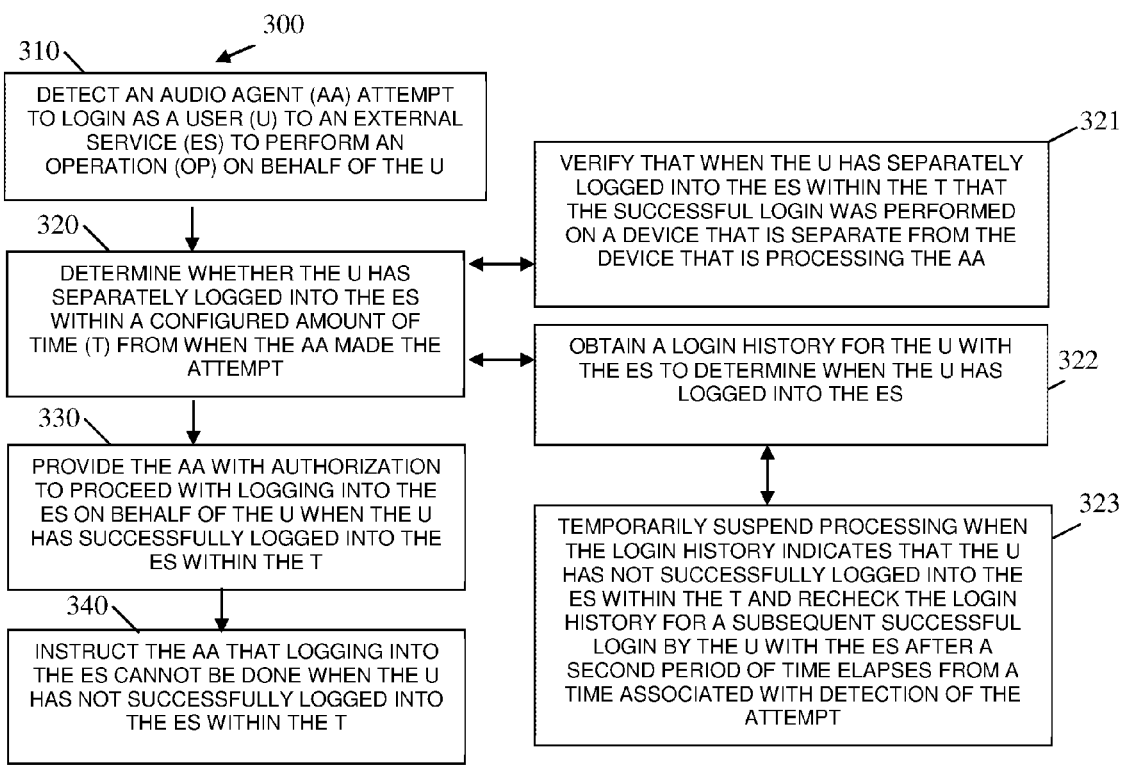
FIG. 3 is a diagram of another method for voice authentication through a secondary device, according to an example embodiment.

FIG. 3 is a diagram of another method for voice authentication through a secondary device, according to an example embodiment. The software module(s) that implements the method 300 is referred to as a "voice authenticator." The voice authenticator is implemented as executable instructions programmed and residing within memory and/or a non-transitory computer-readable (processor-readable) storage medium and executed by one or more hardware processors of a hardware device. The processors of the device that executes the voice authenticator are specifically configured and programmed to process the voice authenticator. The voice authenticator has access to one or more networks during its processing. The networks can be wired, wireless, or a combination of wired and wireless.

The voice authenticator presents another and in some ways enhanced perspective of the method 200.

In an embodiment, the voice authenticator is some combination of or all of: the voice authenticator service 130 and the method 200.

In an embodiment, the device that executes the voice authenticator is a server.

In an embodiment, the device that executes the voice authenticator is a cloud processing environment.

At 310, the voice authenticator detects an audio agent attempting to login as a user to an external service to perform an operation on behalf of the user. This can be done in any of the manners discussed above in the FIGS. 1-2.

At 320, the voice authenticator determines whether the user has separately logged into the external service within a configured amount of time from when the audio agent made the attempt at 310.

According to an embodiment, at 321, the voice authenticator verifies that when the user has separately logged into the external service within the configured amount of time that the successful login was performed on a device that is separate and independent from the device that is processing the audio agent.

In an embodiment, at 322, the voice authenticator obtains a login history for the user with the external service to determine when the user has logged into the external service.

In an embodiment of 322 and at 323, the voice authenticator temporarily suspends processing (processing of the voice authenticator) when the login history indicates that the user has not successfully logged into the external service with the configured amount of time. Then, the voice authenticator rechecks the login history (which may or may not have been updated by the external service during the pausing period of time) for a subsequent successful login by the user with the external service after the second period of time elapses from a time associated with detection of the attempt made by the audio agent at 310.

At 330, the voice authenticator provides the audio agent with authorization to proceed with logging into the external service on behalf of the user when the user has successfully logged into the external service within the configured amount of time.

In an embodiment, at 340, the voice authenticator instructs the audio agent that logging into the external service cannot be done when the user has not successfully logged into the external service (separately and from a different device for that which processes the audio agent) within the configured amount of time.

Figure 4:
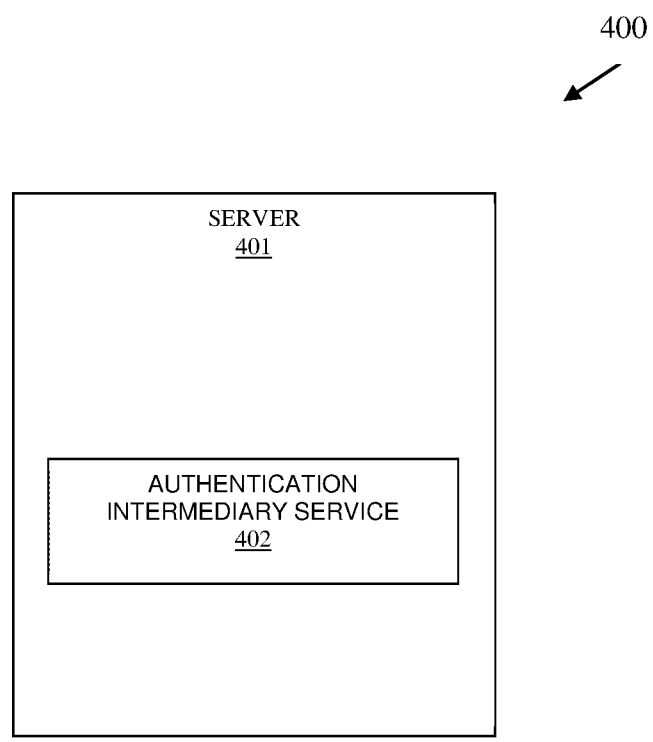
FIG. 4 is a diagram of another system for voice authentication through a secondary device, according to an example embodiment.

FIG. 4 is a diagram of another system 400 for voice authentication through a secondary device, according to an example embodiment, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including an intermediary authentication service 402.

The intermediary authentication service 402 is configured to: 1) execute on at least one hardware processor of the server 401; 2) provide a second and additional form of authentication when a user attempts to use an audio agent with a credential for accessing an external service, wherein the credential is a first form of authentication for accessing the external service, 3) determine, as the second and additional form of authentication whether the user has successfully logged into the external service through a separate device from that which processes the audio agent within a configurable amount of time that precedes or that succeeds a time in which the user attempted to use the audio agent for accessing the external service.

In an embodiment, the intermediary authentication service 402 is the intermediary authentication service 130.

In an embodiment, the intermediary authentication service 402 is all or some combination of the methods 200 and 300 of the FIGS. 2 and 2, respectively.

In an embodiment, the server 401 is part of or configured within a cloud processing environment.

In an embodiment, the intermediary authentication service 402 is a subscription-based cloud service.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving a request to validate a successful login of a user to an external service;
   obtaining at least one login event for the user with the external service;
   comparing a first time that the request was received against a second time associated with the at least one login event, wherein comparing further includes determining whether the second time was associated with a non-voice login to the external service that utilized a user non-voice login device that is different from a user voice-login device associated with the first time, and invalidating the successful login when the second time is not associated with the non-voice login or when the user non-voice login device is not different from the user voice-login device;
   providing an audio agent with an indication as a result of the comparing as to whether the successful login for the user occurred; and
   processing an operation provided by voice command of the user with the external service by the audio agent translating audio associated with the voice command to a text command and providing the text command to the external service to process on behalf of the user based on the comparing.

2. The method of claim 1, wherein receiving further includes receiving the request from an audio agent device that processes the audio agent, and identifying the request as being associated with the user providing a credential for accessing the external service in an audio format to the audio agent.

3. The method of claim 1, wherein receiving further includes receiving the request as a login request of the user for access to the external service and the login request initiated by the audio agent from an audio agent device and redirected by the external service to the method for processing.

4. The method of claim 1, wherein obtaining further includes obtaining the at least one login event as a push notification provided by the external service.

5. The method of claim 4, wherein obtaining further includes acquiring the at least one event from a secure website that the external service published the push notification to.

6. The method of claim 1, wherein obtaining further includes logging into the external service through an account of the method with the external service and obtaining the at least one event as a query on a login history of the user as maintained by the external service.

7. The method of claim 1, wherein comparing further includes determining whether the first time and the second time is within a configured amount of time of one another.

8. The method of claim 7, wherein determining further includes identifying the second time as preceding the first time within the configured amount of preceding time.

9. The method of claim 7, wherein determining further includes identifying the second time as a time that follows the first time before the configured amount of time elapses from the first time.

10. The method of claim 1, wherein comparing further includes suspending the processing of the method for a configured amount of time, and then determining whether any at least one second login event is available from the external service for the user indicating that the user has subsequent to the first time logged into the external service.

11. The method of claim 1, wherein providing further includes providing the indication as information indicating whether the user has successfully logged into the external service from the user non-voice login device that is separate from the user voice login device that also processes the audio agent within a configurable amount of time that preceded the first time or that succeeded the first time.

12. The method of claim 11, wherein when the indication provides the information that indicates the user has successfully logged into the external service within the configurable amount of time, permitting the audio agent to log into the external service to perform an operation that was audibly communicated by the user to the audio agent.

13. The method of claim 11, wherein when the indication provides the information that indicates the user has not successfully logged into the external service within the configurable amount of time, ignoring, by the audio agent, a user instruction for the audio agent to log into the external service on behalf of the user and perform an audibly communicated operation.

14. A method, comprising:
   detecting an audio agent attempt to login as a user to an external service to perform an operation on behalf of the user;
   determining whether the user has separately logged into the external service through a separate login within a configured amount of time from when the audio agent made the attempt;
   providing the audio agent with authorization to proceed with logging into the external service on behalf of the user when the user has successfully logged into the external service within the configured amount of time; when the separate login utilized a user non-voice login device for the second login that is different from a user voice-login device that processes and is being utilized by the audio agent; and when the separate login was a non-voice login performed by the user; and
   processing a text command that is translated by the audio agent from a voice command provided by voice of the user and performing the text command as the operation initiated by the user with the external service based on the determining and the providing.

15. The method of claim 14 further comprising, instructing the audio agent that logging into the external service cannot be done when the user has not successfully logged into the external service within the configured amount of time.

16. The method of claim 14, wherein determining further includes obtaining a login history for the user with the external service to determine when the user has logged into the external service.

17. The method of claim 16, wherein determining further includes temporarily suspending processing when the login history indicates that the user has not successfully logged into the external service within the configured amount of time and rechecking the login history for a subsequent successful login by the user with the external service after a second period of time elapses from a time associated with detection of the attempt.

18. A system (SST), comprising:
- a server; and
- an authentication intermediary service;
- wherein the authentication intermediary service is configured to:
  - (i) execute on at least one hardware processor of the server;
  - (ii) provide a second and additional form of authentication when a user attempts to use an audio agent with a credential for accessing an external service, wherein the credential is a first form of authentication for accessing the external service, (iii) determine, as the second and additional form of authentication whether the user has successfully logged into the external service through a separate user non-voice login device in a separate login, wherein the user non-voice login device is different than a user voice-login device that processes the audio agent and that is being used by the user for accessing the external service, and determine whether the separate login was a non-voice login performed by the user, and determine whether the separate login is detected has having occurred within a configurable amount of time that precedes or that succeeds a time in which the user attempted to use the audio agent for accessing the external service, and (iv) process a text command translated from a voice command provided by the user and translated by the audio agent with external service as the user based on (iii).

19. The system of claim 18, wherein the server is part of a cloud processing environment.

* * * * *